United States Patent
Kawade

(10) Patent No.: US 7,327,386 B2
(45) Date of Patent: Feb. 5, 2008

(54) IMAGE CAPTURE APPARATUS AND METHOD FOR TRANSMITTING CAPTURED IMAGE WITHOUT PREDETERMINED ADDITIONAL INFORMATION

(75) Inventor: Takahisa Kawade, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 10/848,221

(22) Filed: May 18, 2004

(65) Prior Publication Data

US 2004/0247308 A1    Dec. 9, 2004

(30) Foreign Application Priority Data

May 19, 2003  (JP)  ............... 2003-140460

(51) Int. Cl.
*H04N 5/225*  (2006.01)
(52) U.S. Cl. ............... 348/207.1; 348/14.01; 348/14.12; 348/211.1; 348/211.2
(58) Field of Classification Search ......... 725/105; 348/207.1, 14.12, 14.01, 211.1, 211.2, 231
See application file for complete search history.

(56) References Cited

U.S. PATENT DOCUMENTS 5,892,518 A * 4/1999 Mizobata et al. ........... 345/474
6,597,467 B2 * 7/2003 Miyake et al. ............. 358/1.15
6,813,385 B2 * 11/2004 Ideyama .................... 382/232
6,912,069 B1 * 6/2005 Matsunoshita ............. 358/3.28
7,038,714 B1 * 5/2006 Parulski et al. ........... 348/207.2
2002/0025067 A1 * 2/2002 Tomaru ..................... 382/162
2003/0058354 A1 * 3/2003 Parulski et al. ........... 348/231.6

FOREIGN PATENT DOCUMENTS

JP    08-315106 A    11/1996

* cited by examiner

*Primary Examiner*—Tuan Ho
*Assistant Examiner*—Usman Khan
(74) *Attorney, Agent, or Firm*—Canon U.S.A. Inc I.P. Div

(57) ABSTRACT

An image capture apparatus includes an image capture unit, an image processing unit, a memory, and a network interface unit. The image capture unit captures an image. The image processing unit generates an image file including the captured image and additional information and stores the image file in a storage medium. The memory stores the image file read from the storage medium. The network interface unit transmits the image file stored in the memory to an external apparatus via a network. Furthermore, the network interface unit deletes predetermined additional information from the image file before transmitting the image file to the external apparatus, the predetermined additional information including information relating to a user of the image capture apparatus.

12 Claims, 10 Drawing Sheets

FIG. 6

|  | DELETE | NOT DELETE |
|---|---|---|
| NAME OF MANUFACTURER | ☐ | ✓ |
| MODEL NAME | ☐ | ✓ |
| IMAGE-CAPTURING INFORMATION | ☐ | ✓ |
| IMAGE-CAPTURING DATE AND TIME | ☐ | ✓ |
| MAIL ADDRESS | ✓ | ☐ |
| TELEPHONE NUMBER | ✓ | ☐ |
| NAME | ✓ | ☐ |

FIG. 10

| TAG No. | TAG NAME | CONTENT |
|---|---|---|
| 0x010F | Make | The name of manufacturer of a digital camera used in image capturing |
| 0x0110 | Model | The model name of a digital camera used in image capturing |
| 0x9201 | ShutterSpeedValue | Shutter speed represented in APEX value |
| 0x8928 | Copyright | Copyright information of this image file |
| 0x9286 | UserComment | User comment |

IMAGE CAPTURE APPARATUS AND METHOD FOR TRANSMITTING CAPTURED IMAGE WITHOUT PREDETERMINED ADDITIONAL INFORMATION

BACKGROUND OF THE INVENTION

1. Field of the Invention

The present invention relates to image capture apparatuses (e.g., digital cameras, digital camcorders, and camera-equipped cell phones) that transfer image files to destinations.

2. Description of the Related Art

Presently, digital images captured by many digital cameras are stored in EXIF format established by Japan Electronics and Information Technology Industries Association (JEIDA). The EXIF format is fully described in, for example, "JEIDA-49-1998 Digital Still Camera Image File Format Standard (Exchangeable image file format for Digital Still Camera: Exif) Version 2.1, JAPAN ELECTRONIC INDUSTRY DEVELOPMENT ASSOCIATION". An image file in EXIF format includes many pieces of additional information of captured images. These pieces of additional information are automatically added to images captured by a digital camera when it performs image capturing.

A technique for adding various types of additional information to captured images is described in, for example, Japanese Patent Laid-Open No. 08-315106 entitled "DIGITAL CAMERA AND CAPTURED IMAGE DISTRIBUTING SYSTEM". The above publication proposes a technique of storing captured images in a storage medium in a form in which additional information, such as an identification symbol of a photographer, an image-capturing position, image-capturing conditions, an image-capturing date and time, a title, and a memorandum, is added to the captured images. The above publication also proposes transfer of the additional-information-added captured images to a captured image database or the like through a network.

In addition, personal information, such as a mail address, a name, and an address, can be added to the captured images. In this case, in accordance with the personal information added to the captured images, the captured images can be transferred (downloaded/uploaded).

However, when a digital camera is connected to a communication network used by many and unspecified users, such as the Internet, there is a possibility that an image file in the digital camera may be downloaded without authorization by a malicious user. In this case, additional information added to the image file, such as image-capturing information and personal information, will flow out, and the additional information may be misused.

SUMMARY OF THE INVENTION

An object of the present invention is to overcome the above-described drawbacks.

More specifically, another object of the present invention is to prevent additional information (e.g., information concerning captured images and a user) added to an image file from being leaked.

According to an aspect of the present invention, an image capture apparatus capable of capturing an image and transmitting the image to an external apparatus, includes an image capturing unit capturing the image, an image processing unit processing the captured image into an image file including image information and additional information and storing the image file in a storage medium, a memory for storing the image file read from the storage medium, and a deleting unit deleting predetermined additional information from the image file before the image file is transmitted to the external apparatus.

According to another aspect of the present invention, a method for capturing an image and storing an image file of the captured image in a storage medium, the image file including information corresponding to the captured image, the image capture apparatus capable of coupling to an external apparatus, the method including the steps of detecting a request from the external apparatus for transfer of the image file, reading the image file from the storage medium, and deleting predetermined information from the image file before transmitting the image file to the external apparatus.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 6 is an illustration of an example of a screen for setting pieces of additional information to be deleted.

FIG. 10 is a table showing example pieces of additional information.

DESCRIPTION OF THE PREFERRED EMBODIMENTS

Preferred embodiments of the present invention will be described in detail in accordance with the accompanying drawings.

Figure 1:
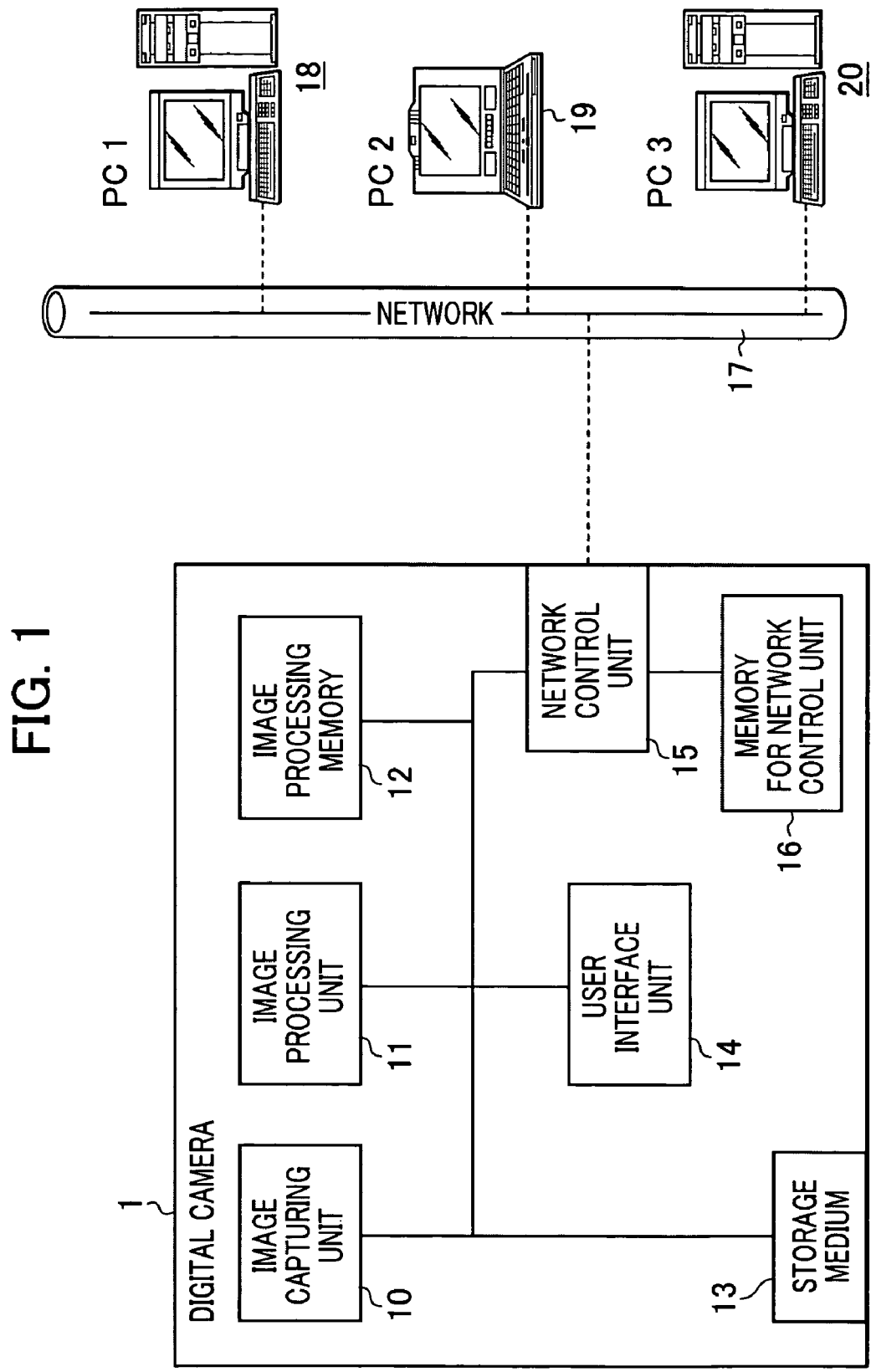
FIG. 1 is a block diagram showing main components of digital camera systems in connection with first, second, and third embodiments of the present invention.

FIG. 1 is a block diagram showing a digital camera system according to each of first, second, and third preferred embodiments of the present invention.

FIG. 1 shows a digital camera 1 which is an example of an image capture apparatus. The digital camera 1 includes an image capturing unit 10.

The image capturing unit 10 includes a lens unit, a charge-coupled device (CCD), and a control unit, and has an image-capturing function. When the user of the digital camera 1 uses a user interface unit 14 to perform image capturing, the image capturing unit 10 captures an image at an angle of view desired by the user.

The digital camera 1 includes an image processing unit 11.

The image processing unit 11 performs processing, such as compression, on captured images obtained by the image capturing unit 10, and stores the resultant image file (such as a JPEG file) in a storage medium 13. Conversely, the image processing unit 11 decompresses each image of the image file stored in the storage medium 13, and displays the image on a liquid crystal panel of the digital camera 1.

The digital camera 1 includes an image processing memory 12.

The image processing memory 12 is formed by a memory, such as a synchronous dynamic random access memory (SDRAM) or a double data rate (DDR) SDRAM, and is used when image processing is performed by the image processing unit 11.

The digital camera 1 includes the storage medium 13.

The storage medium 13 is formed by a memory (such as a compact flash (CF) card or a secure digital (SD) card) which can be loaded into the digital camera 1. The image file stored in the storage medium 13 includes, in addition to captured images, additional information (including information concerning the captured images, the user, etc.) concerning the captured images.

Here, the storage medium 13 is regarded as one that can be loaded/unloaded. If the storage medium 13 is a built-in memory of the digital camera 1 and cannot be unloaded, no particular problem occurs.

The digital camera 1 includes a user interface unit 14. The user interface unit 14 includes an electronic viewfinder (EVF), a light emitting diode (LED), and various setting buttons such as a shutter button. The user uses the user interface unit 14 to perform setting of deletion of additional information, setting of a destination, which does not require deletion of additional information, and various types of setting for the digital camera 1, image capturing, and playback.

The digital camera 1 includes a network control unit 15. The network control unit 15 controls communication between the digital camera 1 and each destination through a communication network such the Internet. The digital camera 1 has an assigned address enabling the digital camera 1 to be identified, such as an IP address. The digital camera 1 uses the assigned address to connect to the communication network such as the Internet. The connecting method is not limited. No problem occurs if either a wired local area network (LAN), such as Ethernet (registered trademark), or a wireless LAN as defined in the IEEE 802.11 standard, is used to establish connection.

The network control unit 15 has a function of deleting the additional information automatically added in image capturing, such as the name of a manufacturer, a model name, and personal information, in the case of using the communication network, such as the Internet, to transfer (download/upload) the image file of the digital camera 1 which is stored in the storage medium 13. In addition, the network control unit 15 includes a memory (not shown) for storing information which specifies additional information to be deleted from the image file before it is transferred. When the additional information to be deleted is changed by the user, the network control unit 15 changes the content of the above memory.

The digital camera 1 includes a memory 16 for the network control unit 15.

The memory 16 is used to delete predetermined additional information (e.g., the name of a manufacturer, a model name or personal information) before the image file read from the storage medium 13 is transferred through the network.

In the following embodiments, the memories 12 and 16 are described, with them distinguished for different uses from each other. However, both memories are not limited to this form. A single memory is used as the memories 12 and 16 depending on the system configuration of the digital camera 1.

The digital camera 1 is connected to a communication network 17 such as the Internet.

Each of the following embodiments describes a case in which the communication network 17 is the Internet. However, the communication network 17 is not limited to the Internet. A method of connecting to the communication network 17 may be connection using a wired LAN, such as Ethernet (registered trademark), or connection using a wireless LAN as defined in the IEEE 802.11 standard. There is no particular limitation in the above method if it is one that can connect to the communication network 17. In addition, the digital camera 1 may have either a configuration that is directly connected to the communication network 17, or a configuration connected to the communication network 17 through a connecting unit.

External apparatuses 18, 19, and 20 use the communication network 17 to communicate with the digital camera 1. The following embodiments describe a case in which the external apparatuses 18, 19, and 20 are personal computers (PCs).

1. First Embodiment

The operation of a first embodiment of the present invention is described below with reference to FIGS. 1 to 4.

A process of a digital camera 1 according to the first embodiment is described below with reference to FIG. 4.

In step S401, the digital camera 1 is activated and is connected to the communication network 17. The digital camera 1 is in a state capable of initiating communication anytime. The operation mode of the digital camera 1 at this time is not particularly limited if it is one of operation modes (such as image capturing, playback, and communication) of the digital camera 1 which can connect to the communication network 17.

In step S402, it is determined whether occurrence of a request to transfer (download/upload) an image file of the digital camera 1 through the communication network 17 is detected.

The occurrence of the request to transfer the image file can be divided into two cases.

One is that the digital camera 1 itself uses the communication network 17 to transfer the image file to a specified address (such as an IP address, a mail address, or a uniform resource locator (URL)). The other is that an external apparatus, such as the personal computer 18, 19, or connected to the communication network 17, sends an image-file transfer request to the digital camera 1.

Regarding the first embodiment, a request transferring side that sends the image-file transfer request in step S402 may be one of the digital camera 1 and the personal computer 18, 19, or 20 in the above cases. In addition, one that transfers the image file and a destination to the image file is transferred may not include the request transferring side. In the case of a request to transfer the image file of the digital camera 1 through the communication network 17, the request transferring side is not particularly limited.

When the network control unit 15 detects the request to transfer the image file of the digital camera 1, the process proceeds to step S403.

Figure 3:
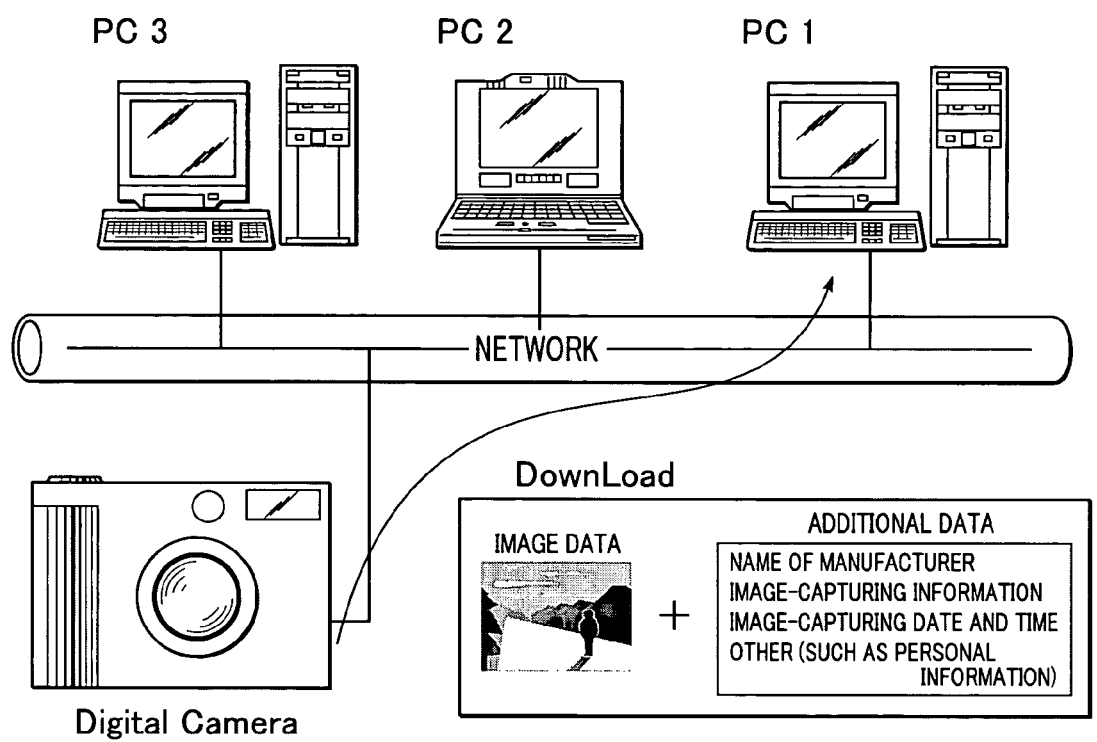
FIG. 3 is a block diagram showing a digital camera that transfers an image file to a destination without deleting additional information (including information concerning captured images, a user, etc.).

FIG. 3 shows a digital camera that transfers an image file to a destination without deleting additional information (including information concerning captured images, a user, etc.). In this case, additional information, such as the name of a manufacturer, a model name, image-capturing information, image-capturing date and time, and personal information, is transferred with captured images. The transfer of the above pieces of additional information through a communication network, such as the Internet, has a possibility that an excessive amount of information may be leaked to many and unspecified users.

To minimize such leakage of information, a transferring image file in which additional information included in the image file is deleted is created.

In step S403, among image files stored in the storage medium 13, an image file on which the transfer request is detected in step S402 is read in order to delete the additional information added in image capturing. In step S404, the read image file is copied into the memory 16, and creation of a transferring image file is initiated.

In step S405, the additional information other than the captured images, included in the image file on which the transfer request is detected, is deleted. Processing performed in step S405 is described below.

Many image files of images captured by the digital camera 1 are stored in EXIF format. In the image files, file separators (hereinafter referred to as "markers") which are basically equivalent to those in JPEG image format are used. The start marker and end marker of each image file must bear "xFFD8" and "0xFFD9", respectively.

Also, in the image file in EXIF format, a plurality of tag numbers are assigned. Thus, various pieces of additional information other than the captured images can be added. Example of typical tags are shown in FIG. 10.

The network control unit 15 creates a transferring image file in which pieces of additional information added in the image file in the memory 16, which are managed by the tags, the pieces of information required for image playback are left and unnecessary information, such as the name of a manufacturer and a model name, is deleted.

Figure 2:
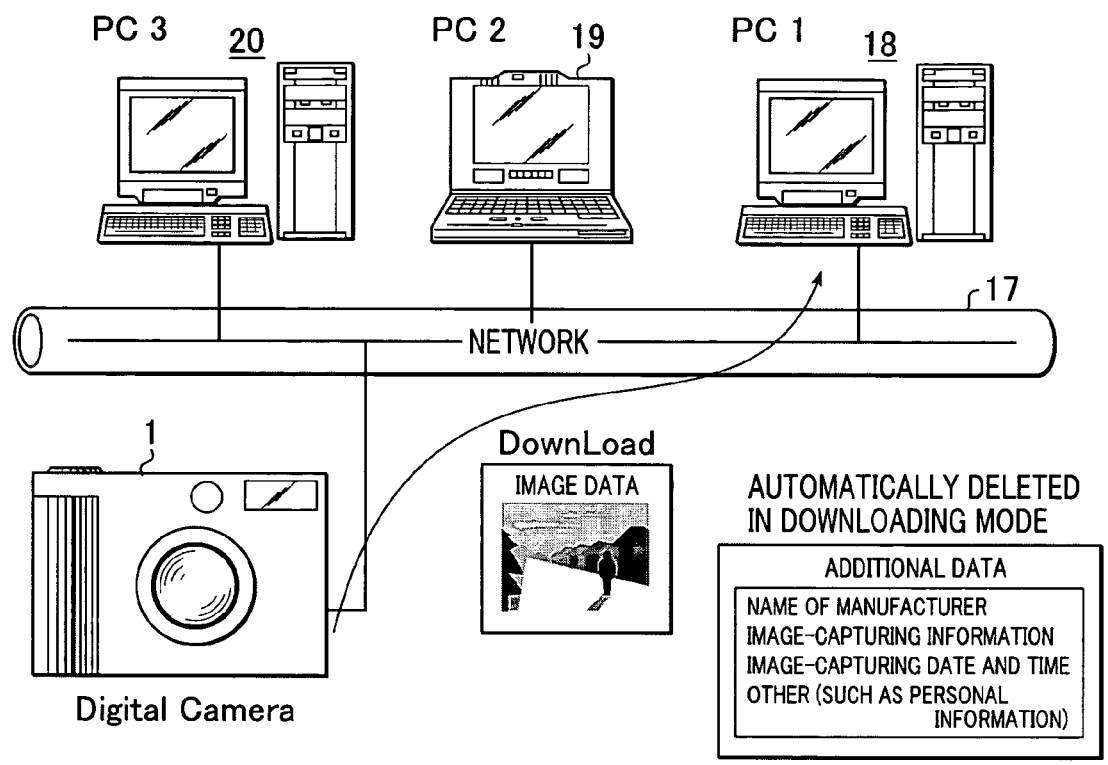
FIG. 2 is a block diagram showing the operation of the digital camera system in connection with the first embodiment of the present invention.

After the creation of the transferring image file in which essential information is left and unnecessary information is deleted is completed, in step S406, as shown in FIG. 2, transfer (downloading/uploading) to the communication network 17 of the transferring image file, which contains only image information, is initiated.

Figure 4:
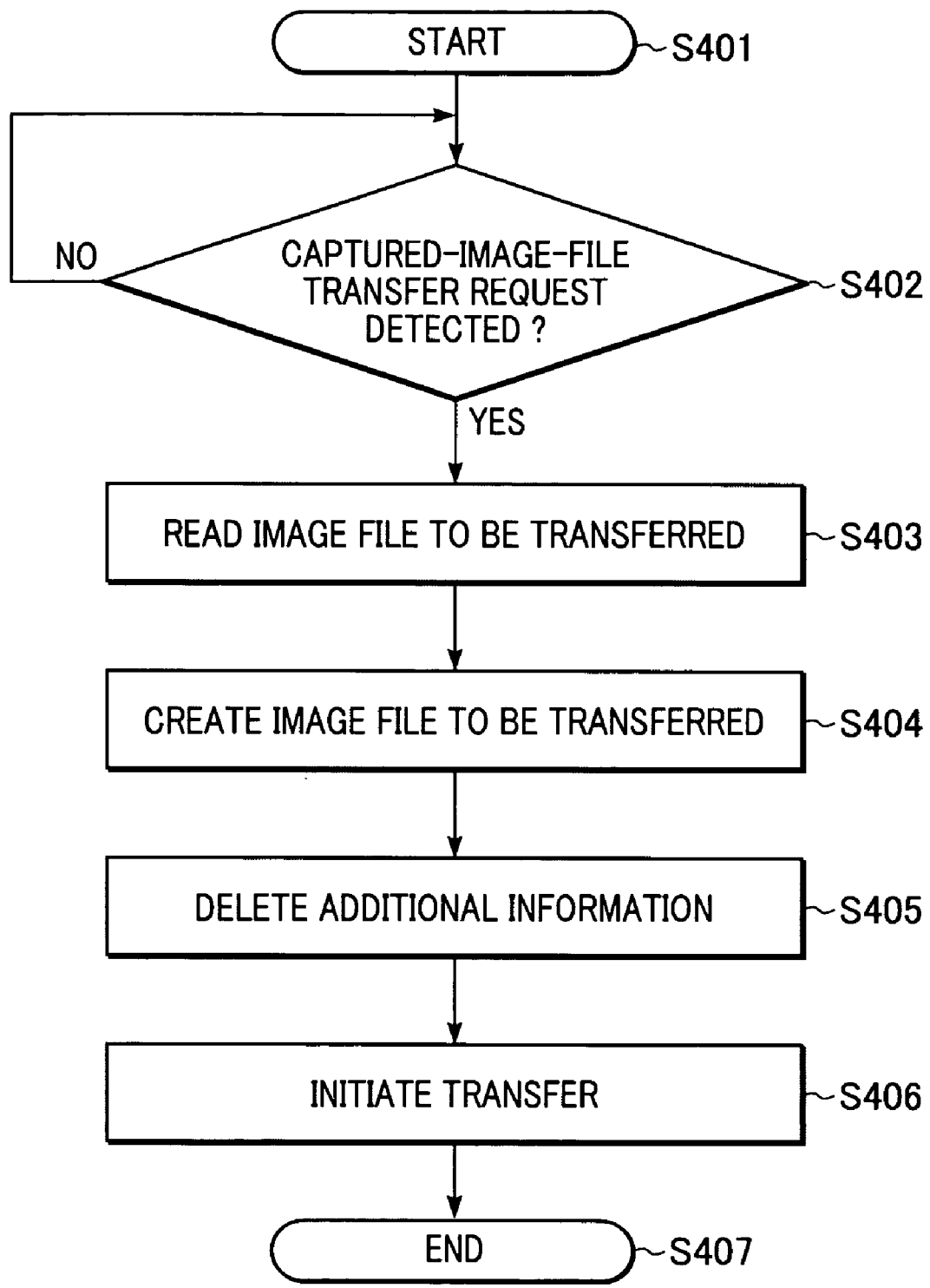
FIG. 4 is a flowchart illustrating a process of a digital camera that is an image capture apparatus according to the first embodiment.

When the transfer of the image file in step S406 ends, the process in FIG. 4 proceeds to step S407 to end.

The first embodiment can be realized by a file format other than the EXIF format if the file format is a type of file format in which captured images are stored with additional information. For example, the first embodiment can be realized by the Design Rule for Camera File System (DCF). In addition, the first embodiment can be realized by an image capture apparatus such as a digital camcorder or a camera-equipped cell phone.

2. Second Embodiment

A second embodiment of the present invention is described below with reference to FIGS. 1 to 3, and FIGS. 5 to 7.

Figure 5:
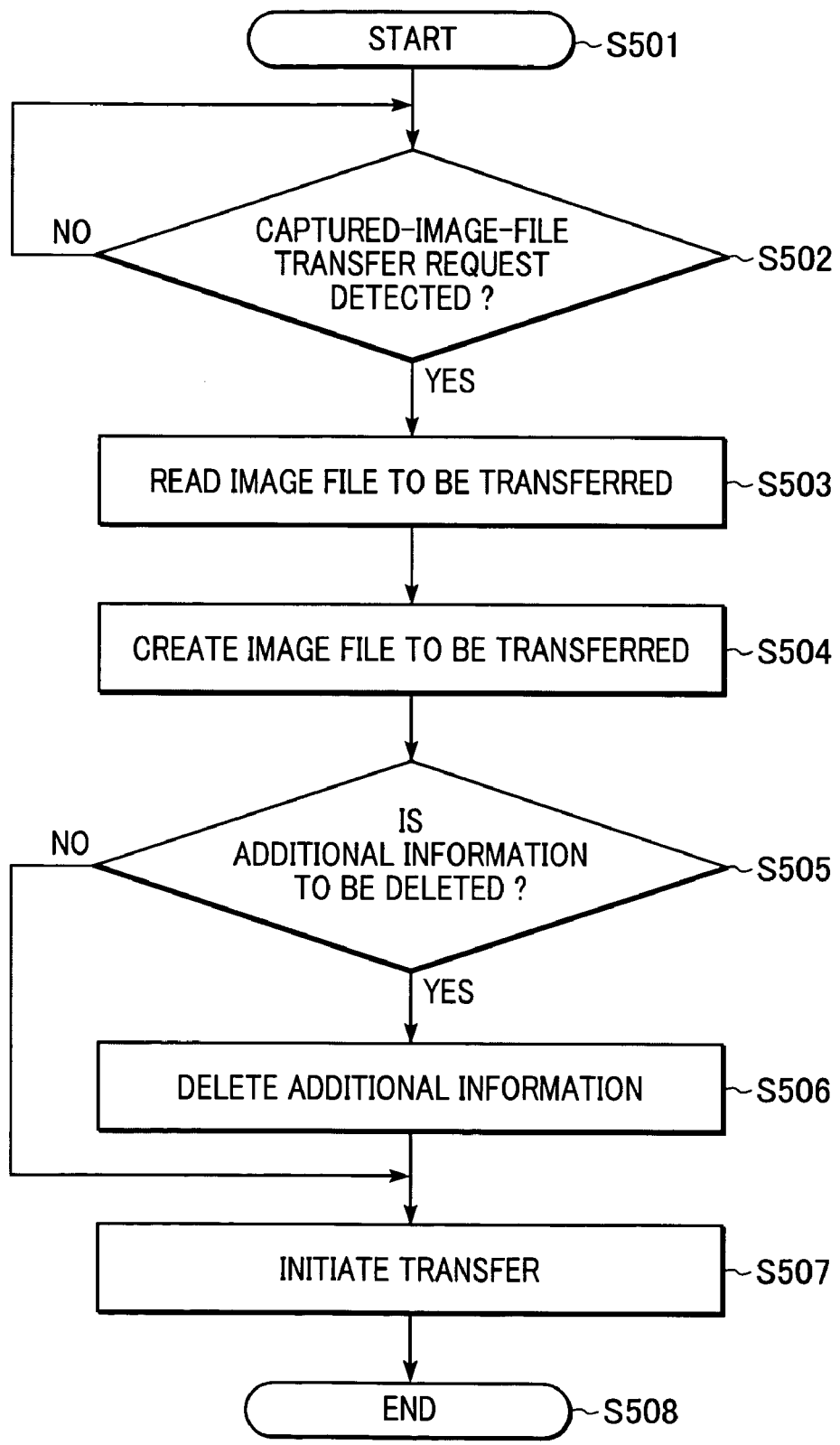
FIG. 5 is a flowchart illustrating a process of a digital camera that is an image capture apparatus used as each of the image capture apparatuses according to the second and third embodiments.

A process of a digital camera according to the second embodiment is described below with reference to FIG. 5.

In step S501, the digital camera 1 is activated and is connected to the communication network 17. The digital camera 1 is in a state capable of initiating communication anytime. The operation mode of the digital camera 1 at this time is not particularly limited if it is one of operation modes (such as image capturing, playback, and communication) of the digital camera 1 which can connect to the communication network 17.

In step S502, it is determined whether occurrence of a request to transfer (download/upload) an image file of the digital camera 1 through the communication network 17 is detected.

The occurrence of the request to transfer the image file can be divided into two cases.

One is that the digital camera 1 itself uses the communication network 17 to transfer the image file to a specified address (such as an IP address, a mail address, or a URL). The other is that an external apparatus, such as the personal computer 18, 19, or 20 connected to the communication network 17, sends an image-file transfer request to the digital camera 1.

Regarding the second embodiment, a request transferring side that sends the image-file transfer request in step S402 may be one of the digital camera 1 and the personal computer 18, 19, or 20 in the above cases. In addition, one that transfers the image file and a destination to the image file is transferred may not include the request transferring side. In the case of a request to transfer the image file of the digital camera 1 through the communication network 17, the request transferring side is not particularly limited.

When the network control unit 15 detects the request to transfer the image file of the digital camera 1, it proceeds to step S503.

FIG. 3 shows the digital camera that transfers the image file to the destination without deleting additional information (including information concerning captured images, a user, etc.). In this case, captured images with additional information, such as the name of manufacturer, a model name, image-capturing information, image-capturing date and time, and personal information, is transferred with the captured images. The transfer of the above pieces of additional information through the communication network, such as the Internet, has a possibility that an excessive amount of information may be leaked to many and unspecified users.

To minimize such leakage of information, a transferring image file in which additional information included in the image file is deleted is created.

In step S503, among image files stored in the storage medium 13, an image file on which the transfer request is detected in step S502 is read. In step S504, the read image file is copied into the memory 16, and creation of the transferring image file is initiated.

In step S505, it is determined by the user whether additional information is to be deleted in the image file, among image files stored in the storage medium 13, on which the transfer request is detected in order to create the transferring image file.

The digital camera 1 uses its user interface unit 14 (such as a liquid display panel) to display a list of deletable pieces of additional information, as shown in FIG. 6. By using the user interface unit 14 (such as setting buttons), the user determines to delete or not to delete each displayed deletion item.

If, in step S505, the user selects "NOT DELETE" for all the items, in step S507, transfer of the image file in the memory 16 is initiated without being modified. In other words, as shown in FIG. 3, the digital camera 1 transfers the image file to a destination without deleting the additional information (including information concerning captured images, the user, etc.).

When, in step S505, among pieces of additional information included in the image file on which the transfer request is detected, particular pieces of the additional information are selected for deletion, the process proceeds to step S506, and only the selected pieces of additional information are deleted.

Processing performed in step S506 is described below.

Many image files of images captured by the digital camera 1 are stored in EXIF format. In the image files, the markers which are basically equivalent to those in JPEG image format are used. The start marker and end marker of each image file must bear "xFFD8" and "0xFFD9", respectively.

Also, in the image file in EXIF format, a plurality of tag numbers are assigned. Accordingly, various pieces of additional information other than the captured images can be added. Example of typical tags are shown in FIG. 10.

By deleting only the selected (in step S505) pieces of additional information to be deleted among pieces of additional information, which are managed by the tags, the network control unit 15 creates a new transferring image file.

Figure 7:
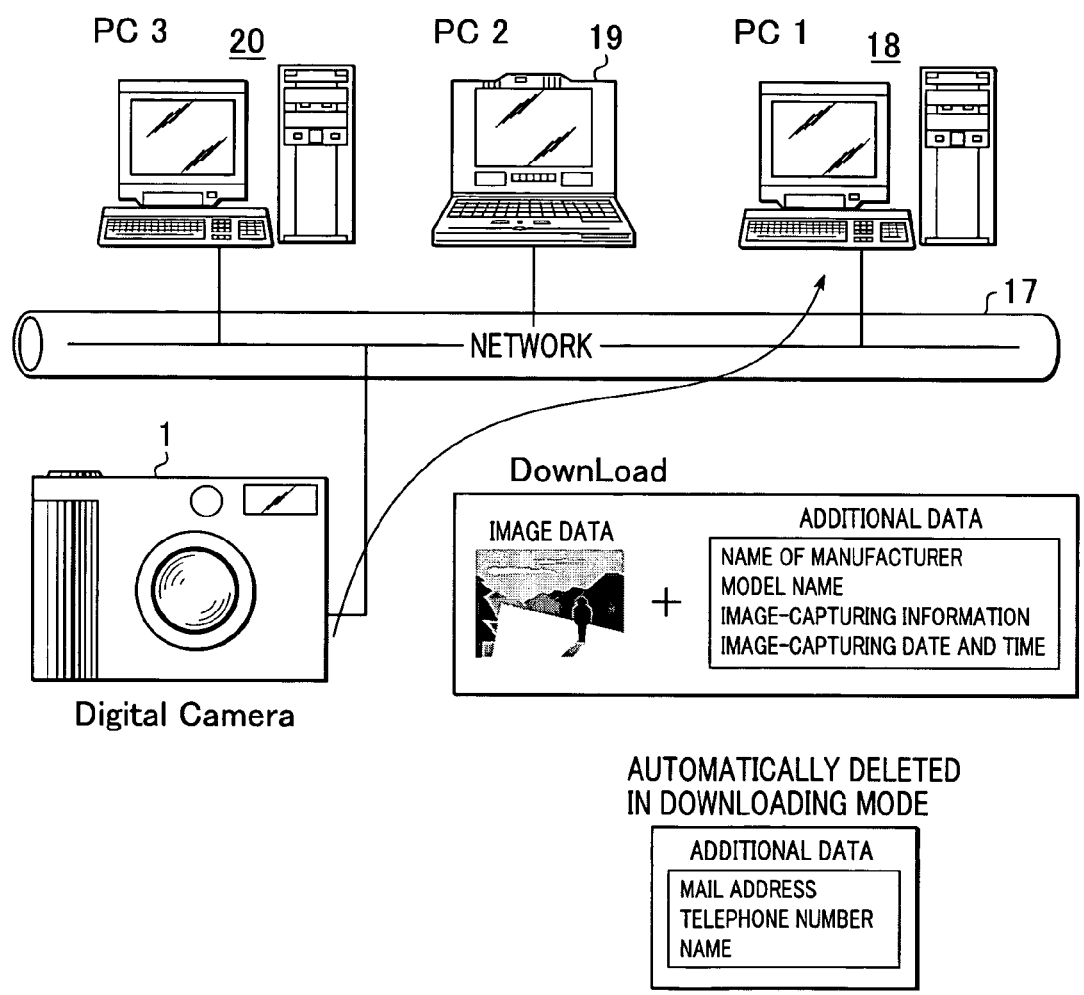
FIG. 7 is a block diagram illustrating the digital camera system according to the second embodiment.

After, in step S506, deletion of the pieces of additional information is executed in accordance with the deletion items selected by the user, when creation of the transferring image file, which is desired by the user, is completed, in step S507, as FIG. 7 shows, transfer (downloading/uploading) of the transferring image file, which consists of the "captured images" and the "additional information desired by the user", is initiated.

When the transfer of the image file in step S507 ends, the process proceeds to step S508 to end.

The second embodiment can be realized by a file format other than the EXIF format if the file format is a type of file format in which captured images are stored with additional information. Also, the second embodiment can be also realized by an image capture apparatus such as a digital camcorder or a camera-equipped cell phone.

The second embodiment has described a case in which pieces to be deleted of additional information in the image file are set (in FIG. 6) for each image file transfer. However, the setting is not limited to the above manner. If a method is used in which, after the user selects deletion items beforehand by using a deletion item setting screen as shown in FIG. 6, the pieces of additional information are deleted by referring to the set deletion items when a transfer request is detected, no problem occurs.

3. Third Embodiment

A third embodiment of the present invention is described below with reference to FIGS. 1 to 3, 5, 8, and 9.

A process of a digital camera 1 according to the third embodiment is described below with reference to FIG. 5.

In step S501, the digital camera 1 is activated and is connected to the communication network 17. The digital camera 1 is in a state capable of initiating communication.

The operation mode of the digital camera 1 at this time is not particularly limited if it is one of operation modes (such as image capturing, playback, and communication) of the digital camera 1 which can connect to the communication network 17.

In step S502, it is determined whether occurrence of a request to transfer (download/upload) an image file of the digital camera 1 through the communication network 17 is detected.

The occurrence of the request to transfer the image file can be divided into two cases.

One is that the digital camera 1 itself uses the communication network 17 to transfer the image file to a specified address (such as an IP address, a mail address, or a URL). The other is that an external apparatus, such as the personal computer 18, 19, or 20 connected to the communication network 17, sends an image-file transfer request to the digital camera 1.

Regarding the second embodiment, a request transferring side that sends the image-file transfer request in step S402 may be one of the digital camera 1 and the personal computer 18, 19, or 20 in the above cases. In addition, one that transfers the image file and a destination to the image file is transferred may not include the request transferring side. In the case of a request to transfer the image file of the digital camera 1 through the communication network 17, the request transferring side is not particularly limited.

When the network control unit 15 detects the request to transfer the image file of the digital camera 1, the process proceeds to step S503.

FIG. 3 shows the digital camera that transfers an image file to the destination without deleting additional information (including information concerning captured images, a user, etc.). In this case, additional information, such as the name of manufacturer, a model name, image-capturing information, image-capturing date and time, and personal information, is transferred with the captured images. The transfer of the above pieces of additional information through the communication network, such as the Internet, has a possibility that an excessive amount of information may be leaked to many and unspecified users.

To minimize such leakage of information, in the case of transferring an image file to apparatuses other than predetermined destinations registered in the digital camera 1, a transferring image file in which the additional information included in the image file is deleted is created.

In step S503, among the image files stored in the storage medium 13, an image file on which a transfer request is detected (in step S502) is read in order to delete the additional information. In step S504, the read file is copied into the memory 16 to initiate creation of a transferring image file.

In step S505, in the case of transferring the image file on which the transfer request is detected, it is determined whether the transferring image file is to be transferred to a destination, which requires deletion of the additional information of the image file. The determination criterion is based on whether the apparatus is registered on a "screen for setting destinations for receiving the transmitted image file, which do not require deletion of additional information".

Figure 8:
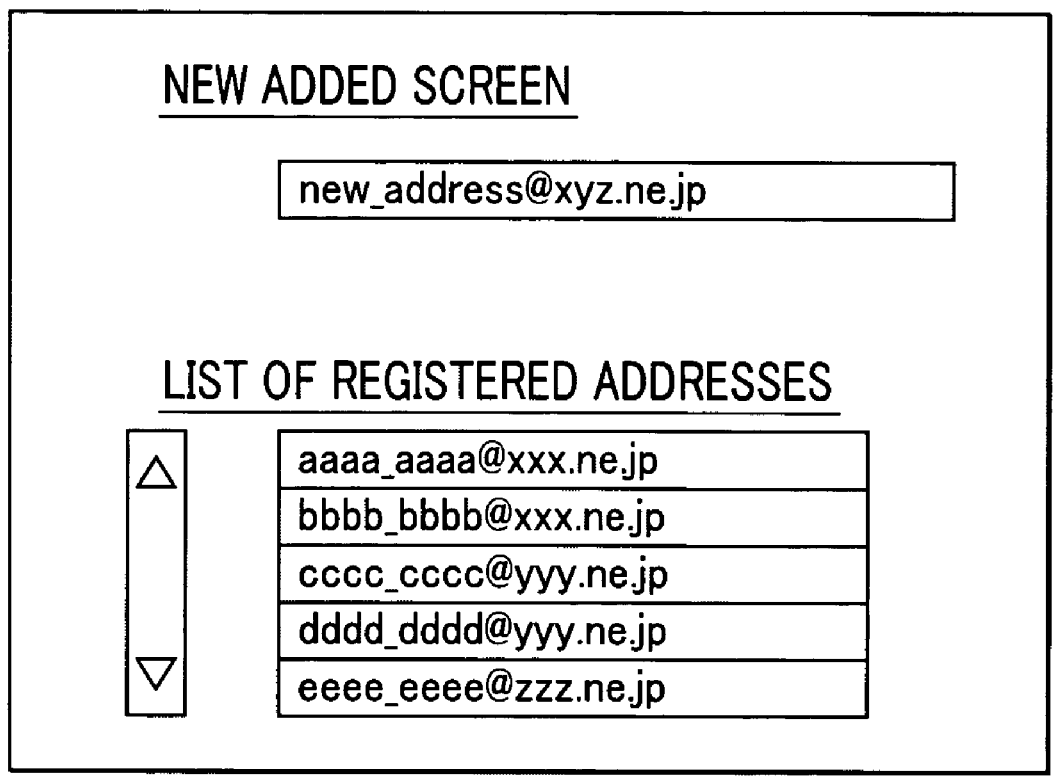
FIG. 8 is an illustration of an example of a screen for setting destinations, which do not require deletion of additional information.

As FIG. 8 shows the registration of the destinations, which do not require deletion of additional information, is performed by the user interface unit 14 (such as a liquid crystal panel, setting buttons, etc.) of the digital camera 1.

When, in step S505, it is determined that the address of a destination is registered as one of destinations, which do not require deletion of additional information, in step S507, transfer of an image file stored in the memory 16 is initiated without processing the image file. In other words, as shown in FIG. 3, the image file is transferred to the destination without deleting its additional information (including information concerning captured images, the user, etc.).

When it is determined in step S505 that the address of the destination is not registered as one of the destinations, which do not require deletion of additional information, the additional information of the image file is deleted.

Processing performed in step S506 is described below.

Many image files of images captured by the digital camera 1 are stored in EXIF format. In the image files, markers which are basically equivalent to those in JPEG image format are used. The start marker and end marker of each image file must bear "xFFD8" and "0xFFD9", respectively.

Also, in the image file in EXIF format, a plurality of tag numbers are assigned. Accordingly, various pieces of additional information other than the captured images can be added. Example of typical tags are shown in FIG. 10.

By deleting pieces of additional information which are managed by the tags and which are included in an image file stored in the memory 16, the network control unit 15 creates a new transferring image file.

Figure 9:
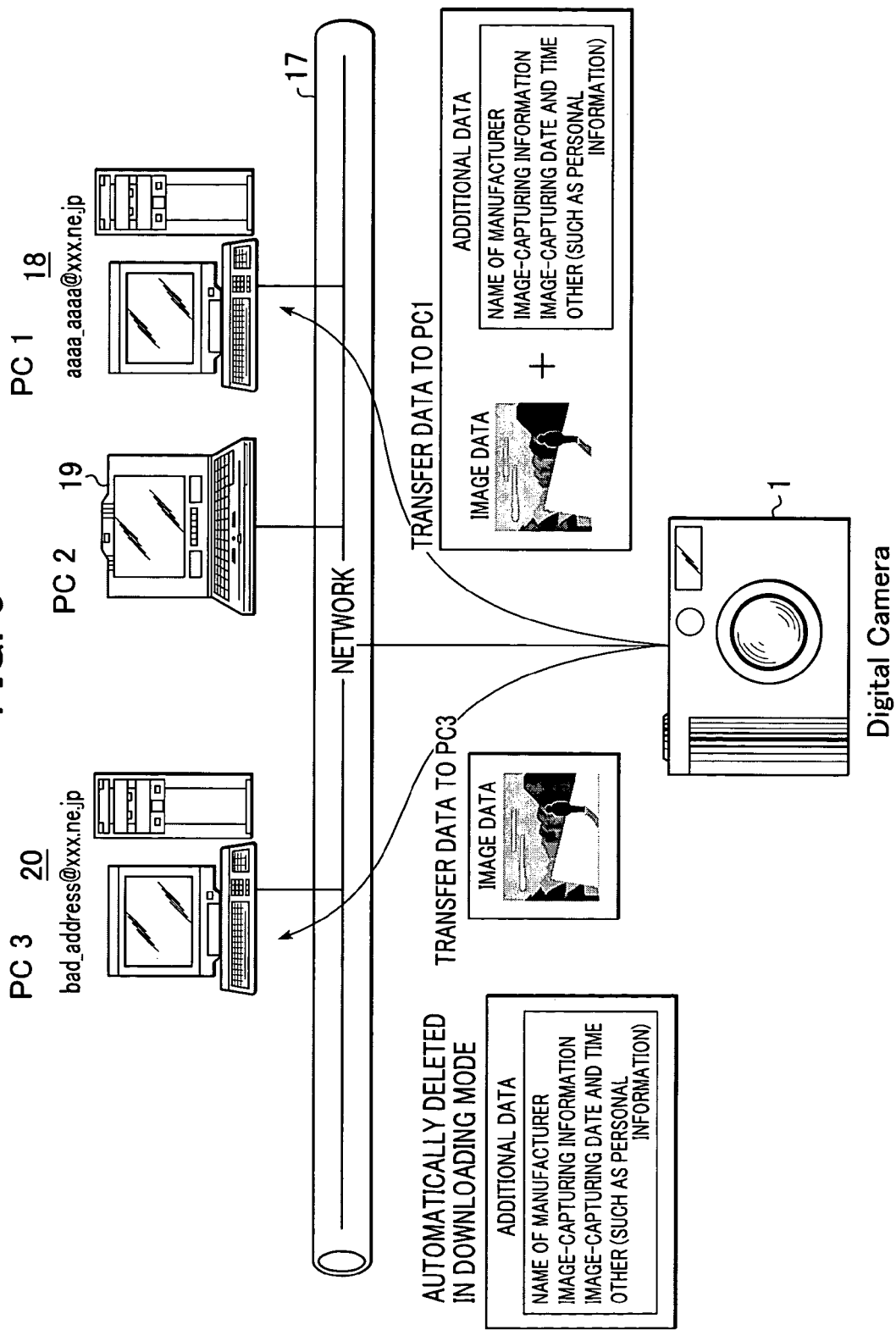
FIG. 9 is a block diagram illustrating the operation of the digital camera system in connection with the third embodiment.

After the deletion of the additional information is executed in step S506 and the creation of the transferring image file is completed, as indicated by the transfer to the personal computer (PC) 3 which is shown in FIG. 9, additional information other than captured images is deleted from the image file stored in the storage medium 13, and transfer (downloading/uploading) of a transferring image file formed by only the "captured images" is initiated in step S507.

After the transfer of the image file in step S507 ends, the process proceeds to step S508 to end.

The third embodiment can be realized by a file format other than the EXIF format if the file format is a type of file format in which captured images are stored with additional information. For example, the first embodiment can be realized by the Design Rule for Camera File System (DCF). Also, the third embodiment can be also realized by an image capture apparatus such as a digital camcorder or a camera-equipped cell phone.

In the third embodiment, on the "screen for setting destinations for receiving the transmitted image file, which do not require deletion of additional information" shown in FIG. 8, designation of the destinations is shown by an example of designation using mail addresses. However, the designation is not limited to the above example. The designation has no particular limitation if it is a means capable of specifying a particular person (a particular address, or a particular place), such as an IP address or a URL.

In addition, for each image file transfer, it is not necessary to perform setting using the "screen for setting destinations for receiving the transmitted image file, which do not require deletion of additional information". Accordingly, a method of registering settings in the digital camera 1 beforehand may be used. No problem occurs if a method of ensuring the setting of destinations, which do require deletion of additional information, is used.

In addition, in the case of deleting additional information, as described in the above second embodiment, by using the "deletion item (of additional information) setting screen", pieces to be deleted of additional information may be selected.

As can be easily understood from the above description, according to each embodiment, when captured images are transferred through a network, additional information automatically added in image capturing can be deliberately deleted. Thus, this can prevent information (image-capturing information, an image-capturing date and time, personal information, etc.) concerning captured images and a user from being leaked.

According to the second embodiment, when an image file is transferred, by using the deletion item (of additional information) setting screen as shown in FIG. 6, a user can set items to be deleted, whereby the user can control image-capturing information and personal information which flow to a communication network such as the Internet.

According to the third embodiment, only for each destination (on a network) registered in the digital camera 1, by not deleting additional information included an image file, the user can control the additional information, which flows into the network, depending on a type of destination between a reliable (registered) destination and an unreliable (unregistered) destination.

The above-described processes described in the first, second, and third embodiments can be also implemented by programs executable by a computer in an image capture apparatus (such as a digital camera, a digital camcorder, or a camera-equipped cell phone). In this case, the programs for implementing the processes described in the first, second, and third embodiments are stored in a memory in the image capture apparatus, and are executed by the computer in the image capture apparatus.

The above-described preferred embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An image capture apparatus, comprising:
   an image capture unit configured to capture an image;
   an image processing unit configured to generate an image file including the captured image and additional information and to store the image file in a storage medium;
   a memory configured to store the image file read from the storage medium; and
   a network interface unit configured to transmit the image file stored in the memory to an external apparatus via a network,
   wherein the network interface unit deletes predetermined additional information from the image file before transmitting the image file to the external apparatus, the predetermined additional information including information relating to a user of the image capture apparatus.

2. The image capture apparatus according to claim 1, wherein the predetermined additional information includes information selected by the user.

3. The image capture apparatus according to claim 1, wherein the storage medium is a removable storage medium.

4. The image capture apparatus according to claim 1, further comprising:
   a user interface unit configured to register a destination, wherein the network interface unit deletes the predetermined additional information from the image file before transmitting the image file to the external apparatus if the external apparatus is not the registered destination.

5. The image capture apparatus according to claim 4, wherein the predetermined additional information includes information selected by the user.

6. The image capture apparatus according to claim 4, wherein the storage medium is a removable storage medium.

7. A method for controlling an image capture apparatus, the image capture apparatus including (a) an image capture unit configured to capture an image and (b) an image processing unit configured to generate an image file including the captured image and additional information and to store the image file in a storage medium, the method comprising the steps of:

reading the image file from the storage medium;

transmitting the image file read from the storage medium to an external apparatus via a network; and deleting predetermined additional information from the image file before transmitting the image file to the external apparatus, the predetermined additional information including information relating to a user of the image capture apparatus.

8. The method according to claim 7, wherein the predetermined additional information includes information selected by the user.

9. The method according to claim 7, wherein the storage medium is a removable storage medium.

10. The method according to claim 7, further comprising the step of:

determining whether the external apparatus is a registered destination, wherein the predetermined additional information is deleted from the image file before transmitting the image file to the external apparatus if it is not determined in the determining step that the external apparatus is the registered destination.

11. The method according to claim 10, wherein the predetermined additional information includes information selected by the user.

12. The method according to claim 10, wherein the storage medium is a removable storage medium.

* * * * *